CONTAINER AND METHOD OF DISPENSING LIQUEFIED GASES THEREFROM

Original Filed Oct. 4, 1955 2 Sheets-Sheet 1

INVENTORS
WILLIAM H. KAECHELE
HENRY F. DALEY
BY
ATTORNEY

INVENTORS
WILLIAM H. KAECHELE
HENRY F. DALEY
BY James J. Shanley
ATTORNEY

United States Patent Office

Re. 25,065
Reissued Oct. 31, 1961

25,065

CONTAINER AND METHOD OF DISPENSING LIQUEFIED GASES THEREFROM

Henry F. Daley, Allentown, Pa., and William H. Kaechele, Cocoa Beach, Fla., assignors to Air Products and Chemicals, Inc., Trexlertown, Pa., a corporation of Delaware Original No. 2,907,177, dated Oct. 6, 1959, Ser. No. 538,474, Oct. 4, 1955. Application for reissue Dec. 1, 1960, Ser. No. 73,152
15 Claims. (Cl. 62—53)

Matter enclosed in heavy brackets [ ] appears in the original patent but forms no part of this reissue specification; matter printed in italics indicates the additions made by reissue.

This invention relates to improvements in containers for holding cold liquids and more particularly to apparatus for the storage of a liquefied gas having a relatively low boiling point temperature in which evaporation of the stored liquefied gas is substantially completely avoided.

The present invention provides a three-walled container presenting an inside chamber adapted to receive liquefied gas, an intermediate chamber surrounding the inside chamber adapted to receive a liquid refrigerant and an outside chamber surrounding the intermediate chamber and containing heat insulating material. The liquid refrigerant has a boiling point temperature below the boiling point temperature of the liquefied gas and the heat which leaks through the insulating material of the outermost chamber is dissipated in vaporizing liquid refrigerant. Thus the liquefied gas in the inside chamber is maintained at a temperature below its boiling point temperature. The container provided by the present invention includes a novel system for suspending three vessels one within another to form the chambers mentioned above, and a novel dispensing arrangement operable to deliver liquefied gas from the innermost chamber or liquid refrigerant from the intermediate chamber in which a stream of liquid refrigerant is warmed and utilized to pressurize the liquefied gas or the liquid refrigerant.

Other features of the invention will appear more fully below from the following detailed description considered in connection with the accompanying drawings which disclose one embodiment of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views.

Figure 1:
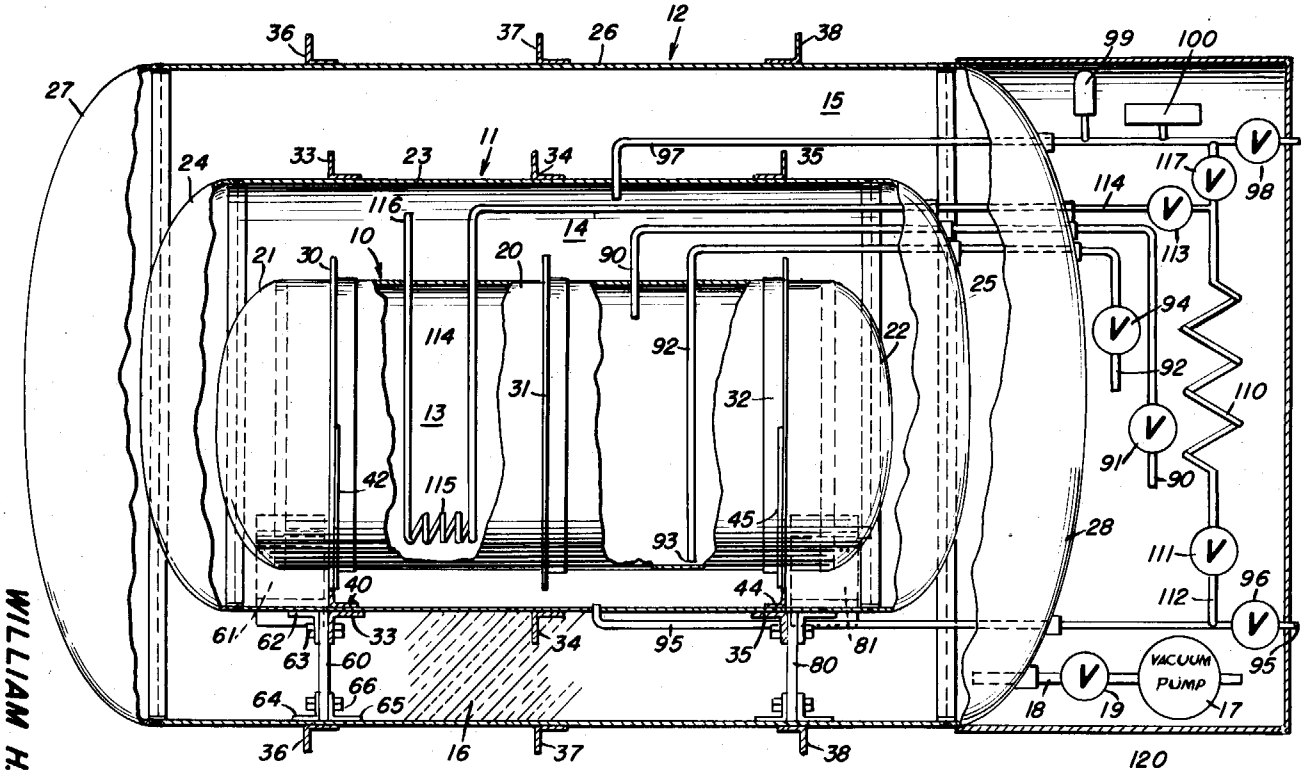
FIG. 1 is a diagrammatic side elevational view, partly in section, of a container constructed in accordance with the principles of the present invention.

With reference more particularly to the drawings, a container constructed in accordance with the principles of the present invention is disclosed therein including an inside vessel 10, an intermediate vessel 11 spaced from and surrounding the inside vessel and an outside vessel 12 spaced from and surrounding the intermediate vessel 11. The walls of the inside vessel 10 define an inside chamber 13, while the walls of the inside vessel and the intermediate vessel define an intermediate chamber 14 and the walls of the intermediate vessel and the walls of the outside vessel define an outside chamber 15. In accordance with the principles of the present invention, the inside chamber 13 is adapted to receive liquefied gas having a relatively low boiling point temperature, the intermediate chamber 14 is adapted to receive a liquid refrigerant and the outermost chamber 15 is filled with heat insulating material 16. For example, the heat insulating material 16 may comprise powdered insulating material such as magnesium carbonate, and the chamber 15 may be maintained under vacuum by means of a vacuum pump 17 having a connection to within the chamber 15 through a conduit 18 provided with a control valve 19.

The vessels 10, 11 and 12 are of substantially cylindrical shape each including a main cylindrical portion having its ends closed by outwardly dished end portions secured thereto by any suitable means such as by welding. In particular, the inside vessel 10 includes a main cylindrical portion 20 and outwardly dished end portions 21 and 22, the intermediate vessel 11 includes a main cylindrical portion 23 and outwardly dished end portions 24 and 25, and the outside vessel 12 includes a main cylindrical portion 26 and outwardly dished end portions 27 and 28. The vessels 10, 11 and 12 may be constructed of any suitable material, such as stainless steel for example. It is to be expressly understood that the vessels may be fabricated in other forms, such as rectangular or spherical, and the principles of the present invention are not limited to the cylindrical vessels shown in the drawings.

Each of the vessels 10, 11 and 12 is provided with a plurality of transversely disposed, longitudinally spaced stiffening members secured to the external surfaces of the main cylindrical portions of the vessels, each stiffening member extending throughout the circumference of respective vessels. As shown, the inside vessel 10 is provided with external stiffening members 30, 31 and 32, the intermediate vessel 11 is provided with external stiffening members 33, 34 and 35, and the outer vessel is provided with external stiffening members 36, 37 and 38. The stiffening members of each of the vessels may comprise annular members of angular cross-section having one flange portion lying parallel to the longitudinal axis of respective vessels and secured to the outside surfaces of the vessels, and another flange portion extending outwardly from respective vessels in a plane perpendicular to their longitudinal axes. The parallel flange portions of the stiffening members may be secured to the outside surfaces of respective vessels by means of welds extending around the circumferences of the vessels. In the arrangement shown in the drawings, each vessel is provided with three stiffening members, one being located in a medial transverse plane of the main cylindrical portions of respective vessels and the others being located inwardly of the ends of the main cylindrical portions. For a purpose that will appear more fully below, corresponding external stiffening members at the ends of each vessel lie in substantially common transverse planes. In particular, the stiffening members 30, 33 and 36 lie in a substantially common transverse plane at one end of the container while stiffening members 32, 35 and 38 lie in a substantially common transverse plane at the other end of the container.

Figure 2:
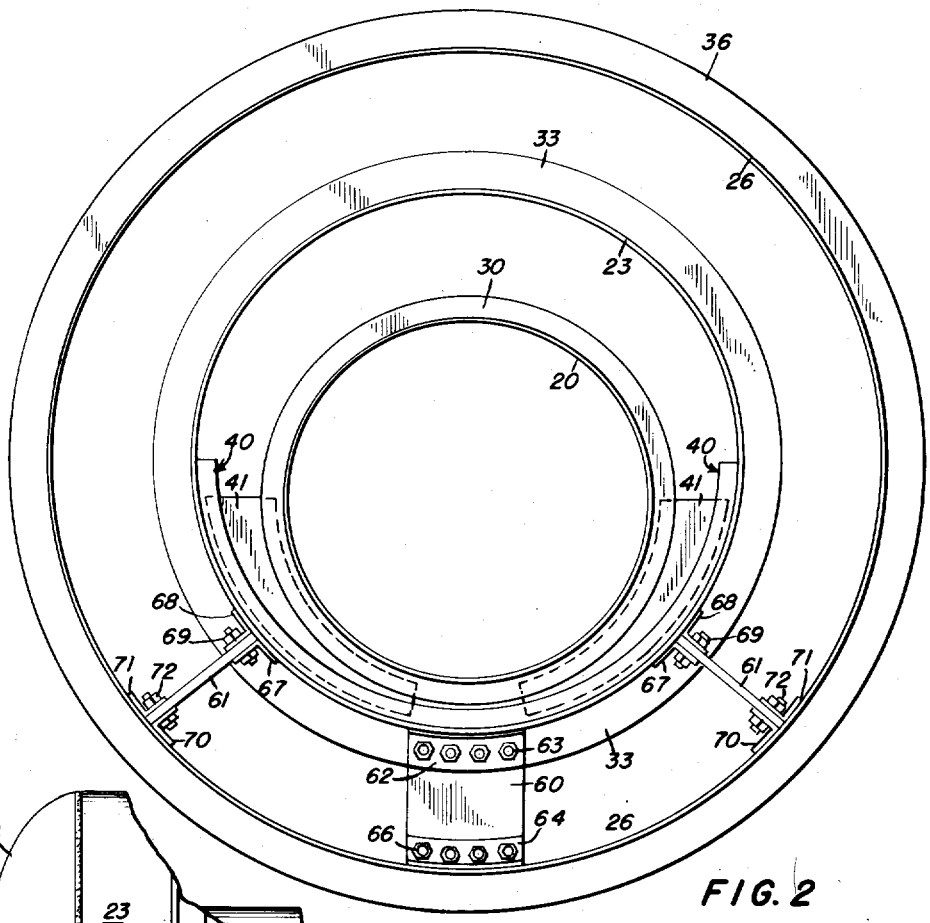
FIG. 2 is a view in elevation of an end of the container shown in FIG. 1 with the end plates of the vessels removed.

The inside vessel 10 is suspended within the intermediate vessel 11, in spaced relation therewith, by means of mechanical connections which function in compression and in shear. As shown in FIGS. 1 and 2, a semicircular member 40, of angular cross-section, is located within the lower half of the intermediate vessel 11 in coplanar relationship with the external annular stiffening member 30 of the inside vessel 10. One flange portion of the member 40, which is parallel to the longitudinal axis of the container, lies flat against and is secured, such as by welding, to the inside surface of the intermediate vessel 11. The other flange portion of the member 40 extends inwardly toward the central longitudinal axis of the intermediate vessel in perpendicular relation therewith and in coplanar relationship with the outwardly extending perpendicular flange portion of the external stiffening member 30 of the inside vessel 10. Curved sector shaped plates 41, 41 are located at opposite sides of the longitudinal axis of the inside vessel 10 in overlying relationship with the coplanar transversely disposed flange portions of the stiffening member 30 and the semicircular member 40. The curved plates 41, 41 are positively secured to the overlying coplanar transversely disposed flange portions by any suitable means, such as by welding. A similar semicircular member 44 of angular cross-section is located within the intermediate vessel at its other end with its transversely disposed flange portion in coplanar relationship with the perpendicular flange portion of the external stiffening member 32 of the inside vessel 10, and the coplanar transversely disposed flange portions are rigidly joined to curved sector shaped plate members 45, in a manner similar to the arrangement shown in FIG. 2. The plates 41 and 42 may be formed of metallic material, such as stainless steel. Since the inside vessel 10 and the intermediate chamber 14 are maintained at the same or substantially the same temperature, a direct metallic support may be employed. Also, the inside vessel 10 may be located relative to the intermediate vessel 11 with the longitudinal axis of the former displaced below the longitudinal axis of the latter, as shown, in order to increase the volume of the intermediate chamber above the inside vessel 11.

Figure 3:
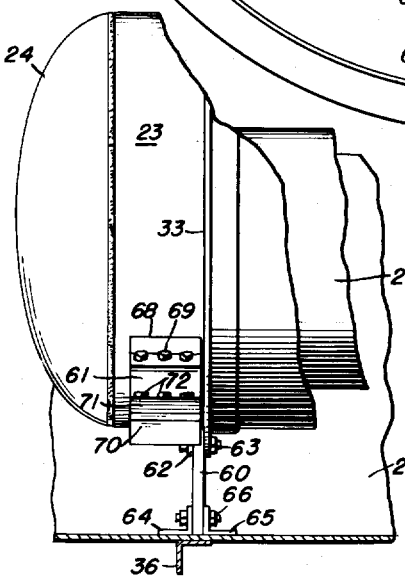
FIG. 3 is a diagrammatic fragmentary view illustrating a feature of the container shown in FIGS. 1 and 2.

The intermediate vessel is supported within the outside vessel by means of a first group of supporting members located in a transverse plane lying substantially in the transverse plane of the external stiffening member 33 of the intermediate vessel and external stiffening member 36 of the outside vessel at one end of the container, and by a second group of supporting members located in a transverse plane lying in the region of the transverse plane of the external stiffening member 35 of the intermediate vessel 11 and the external stiffening member 38 of the outside vessel. The group of supporting members lying in the transverse plane of the stiffening members 33 and 36 is shown in FIG. 2 of the drawings. This group includes a supporting member 60 symmetrically disposed about a vertical plane passing through the longitudinal axis of the container, and a pair of supporting members 61, 61 lying in planes located in radii of the concentric intermediate and outside vessels displaced an equal number of degrees on opposite sides of the vertical plane. The supporting member 60 is of rectangular shape having a width dimension several times greater than its thickness or depth dimension and is disposed with its width dimension lying transversely of the longitudinal axis of the container. The upper edge of the member 60, as viewed in the drawings, is secured to the transversely projecting flange portion of the external stiffening member 33 of the intermediate vessel 11 and to an angle member 62, also secured by welding, for example, to the external surface of the intermediate vessel 11, by means of a plurality of connecting bolts 63. The lower end of the member 60 is secured between a pair of angle members 64 and 65, by means of connecting bolts 66, and the angle members 64 and 65 are welded to the inside surface of the main cylindrical portion 26 of the outside vessel in the region of the external stiffening member 36. The members 61 are also of rectangular shape possessing width dimensions several times greater than their thickness or depth dimensions. The members 61 are disposed with their width dimensions lying longitudinally of the container as shown in FIGS. 1 and 3. The inside ends of the members 61 are clamped between a pair of angle members 67 and 68, by means of connecting bolts 69, and the angle members are welded to the outside surface of the intermediate vessel 10, while the outside ends of the members 61 are clamped between a pair of angle members 70 and 71, by means of connecting bolts 72, and the angle members are welded to the inside surface of the outside vessel 12. The group of supporting members lying in the transverse plane of the external stiffening members 35 and 38 at the other end of the container includes a supporting member 80, similar to the supporting member 60, and a pair of supporting members 81 similar to the supporting members 61. The supporting members 80 and 81 are connected between the intermediate and outside vessels in a manner corresponding to the connection of the supporting members 60 and 61 with these vessels. Also, the supporting member 80 is disposed with its width dimension perpendicular to the longitudinal axis of the container and the supporting members 81 are angularly disposed on opposite sides of the vertical axis of the container with their width dimensions extending longitudinally of the container, similar to the disposition of the supporting members 60 and 61. The supporting members 60, 61, 80 and 81 are constructed of a material having a low coefficient of heat conductivity while possessing sufficient strength to carry the compression and shear loads involved. Well known plastic materials may be utilized. The provision of supporting members of rectangular shape in which the supporting members 60 and 80 are positioned with their width dimension lying transversely of the longitudinal axis of the container and with the supporting members 61 and 81 being disposed with their width dimensions extending longitudinally of the container provides a supporting structure capable of carrying vertical loads due to the mass of the inside and intermediate vessel and their contents as well as transverse and longitudinal stresses that may be developed upon movement of the container from one location to another, for example. This type of construction eliminates the necessity of employing additional bracing means for carrying longitudinal and transverse stresses which not only adds to the cost of the container but increases the heat leak into the intermediate vessel.

As shown in FIG. 1, liquefied gas may be introduced into the chamber 13 formed by the inside vessel 10 through a conduit 90 which extends from without the outside vessel 12 through the walls of the vessels and into the inside chamber 13, the conduit 90 being provided with a control valve 91. Liquefied gas may be withdrawn from the chamber 13 through a conduit 92 having an inlet end 93 located adjacent the bottom wall of the inside vessel 10 and extending upwardly through the upper wall of the inside vessel to without the outside vessel where it is provided with a control valve 94. Liquid refrigerant may be introduced into and withdrawn from the intermediate chamber 14 by way of a conduit 95 passing through the bottom wall of the intermediate vessel 11 and being provided with a control valve 96. The intermediate chamber 14 is also provided with a vapor conduit 97 communicating with the upper or vapor space of the intermediate chamber 14 and extending outwardly from the container where it is provided with a control valve 98. The conduit 97 is also provided with safety devices 99 and 100 which may be of the pop valve and bursting disc types, respectively.

As mentioned above, the present invention provides a novel arrangement for discharging liquefied gas from the inside chamber 13. This is accomplished by withdrawing a stream of liquid refrigerant from the intermediate chamber, warming the withdrawn stream and then passing the warm stream in indirect heat exchange relation with the liquefied gas in the inside vessel 10. As shown in the drawings, this is accomplished by means of a heater 110, which may comprise an air-refrigerant heat exchanger, having its input connected through a valve 111 and a conduit 112 to the liquid refrigerant conduit 95. The warmed stream of refrigerant at the outlet of the heater 110 is conducted past a control valve 113 and then through a conduit 114 to within the chamber 13. The conduit 114 communicates with one end of an indirect heat exchange device 115, which may comprise a coiled extension of the conduit 114, located adjacent the bottom wall of the vessel 10. The other end of the heat exchange device 115 is connected to a conduit 116 extending upwardly through the chamber 13 and discharging into the vapor space of the chamber 14. The flow of warmed refrigerant through the conduit 114 and the heat exchange device 115 increases the temperature of the liquefied gas contained within the vessel 10 and the resulting increase of pressure in the chamber 13 is utilized to positively force liquefied gas from the chamber 13 through the conduit 92. The outlet end of the heater 110 is also connected through a control valve 117 to the vapor conduit 97. With the valves 113 and 98 closed and the valve 117 open the stream of warmed refrigerant is introduced directly into the intermediate chamber 14 to increase the temperature of the liquid refrigerant therein and provide a sufficient pressure to force the liquid refrigerant from the intermediate chamber 14 through the conduit 95.

The various inlet and outlet conduits leading to the vessels are preferably located at one end of the container together with other controls and indicators such as liquid level and pressure indicators. A housing 120 may be provided at this end of the container.

When it is desired to store liquefied gas in the container described above, the vacuum pump 17 is operated to establish a required degree of vacuum in the chamber 15 for efficient insulation. Thereafter the inside chamber 13 is evacuated and liquid refrigerant is introduced into the intermediate chamber 14 by way of the conduit 95. Evacuation of the chamber 13 prior to introduction of the liquid refrigerant is necessary to prevent condensation of moisture in the chamber 13. After the intermediate chamber 14 is filled with liquid refrigerant, the valve 96 is closed and the valve 98 is opened to connect the vapor space of the chamber 14 to atmosphere. Liquefied product may then be introduced into the inside vessel 10 through the conduit 90. During this operation liquefied refrigerant in the intermediate chamber 14 will vaporize while liquefying portions of the liquefied gas that vaporizes upon introduction into the vessel 10, the vaporized refrigerant being blown to the atmosphere through the conduit 97. After the vessel 10 is filled with liquefied gas, the input valve 94 is closed. The liquid refrigerant has a boiling point temperature below the boiling point temperature of the liquefied gas. Therefore, the liquefied gas will not be vaporized due to heat infiltration through the chamber 15 since such heat vaporizes the liquid refrigerant and the liquefied gas will be maintained at a temperature corresponding to the boiling point temperature of the liquid refrigerant. When it is desired to deliver liquefied gas from the inside vessel 10, a stream of liquid refrigerant is withdrawn from the intermediate chamber 14, heated in the heat exchanger 110 and then passed through the heat exchanger 115 to increase the temperature of the liquefied gas and produce a pressure within the innermost vessel 10 sufficient to force the liquefied gas through the outlet conduit 92. When it is desired to remove liquid refrigerant from the intermediate chamber 14 the warmed stream of refrigerant is conducted through the vapor conduit 97 directly into the vapor space of the intermediate chamber 14.

The container described above may be employed to store any cold liquid, the only requirement being that the liquid refrigerant has a boiling point temperature below the boiling point of the cold gas. For example, the container may be utilized to store liquid oxygen in the inside vessel when employing liquid nitrogen as the liquid refrigerant.

Although only one embodiment of the invention has been disclosed and described above, it is to be expressly understood that various changes and substitutions may be made therein without departing from the spirit of the invention as well understood by those skilled in the art. Reference therefore will be had to the appended claims for a definition of the limits of the invention.

What is claimed is:

1. A double walled container for liquefied gases comprising an inner vessel for holding liquefied gas, an outer vessel surrounding and spaced from the inner vessel to provide an intervening insulation space, supporting members traversing the intervening space and being connected to the vessels to support the inner vessel within the outer vessel, the supporting members being disposed in a plurality of groups located in spaced transverse planes, each group including one supporting member located in the region of a longitudinally disposed vertical plane passing through the longitudinal axis of the container and angular supporting members located on opposite sides of the vertical plane, each of the supporting members being of substantially rectangular shape having a width dimension greater than its thickness dimension, the one supporting member of each group being disposed with its width dimension perpendicular to the longitudinal axis of the container and the angular supporting members of each group being disposed with their width dimension parallel to the longitudinal axis of the container.

2. A container as defined by claim 1 in which the supporting members are formed of plastic material having a low coefficient of heat conductivity.

3. A container for liquefied gases comprising an inner vessel for holding liquefied gas, an intermediate vessel surrounding and spaced from the inner vessel providing an inside intervening space for holding a liquid refrigerant, an outer vessel surrounding and spaced from the intermediate vessel to provide an intervening insulation space, supporting members traversing the intervening insulation space and being connected to the intermediate and outer vessels, the supporting members being disposed in a plurality of groups located in spaced transverse planes, each group including one supporting member located in the region of a longitudinally disposed vertical plane passing through the longitudinal axis of the container and angular supporting members located on opposite sides of the vertical plane, each of the supporting members being of susbtantially rectangular shape having a width dimension greater than its thickness dimension, the one supporting member of each group being disposed with its width dimension perpendicular to the longitudinal axis of the container and the angular supporting members of each group being disposed with their width dimension parallel to the longitudinal axis of the container, and means connected between the inner vessel and the intermediate vessel and located in the region of the spaced transverse planes for supporting the inner vessel within the intermediate vessel.

4. A container as defined by claim 3 in which the supporting members are formed of plastic material having a low coefficient of heat conductivity.

5. A container as defined by claim 4 in which the vessels are provided with transverse external stiffening ribs and groups of supporting members are located in the region of external stiffening ribs of the intermediate and outer vessels.

6. A container as defined by claim 5 in which the inner vessel is supported by the intermediate vessel by metallic plate means positioned transversely of the longitudinal axis of the container.

7. A container as defined by claim 6 in which the metallic plate means are located in the region of the transverse plane of the stiffening members of the inner and intermediate vessels.

8. A container as defined by claim 7 in which the longitudinal axis of the inner vessel is displaced below the longitudinal axis of the intermediate vessel.

9. A container for liquefied gases including an inner vessel for holding liquefied gas, an intermediate vessel surrounding and spaced from the inner vessel to provide an intervening chamber for holding liquid refrigerant, an outer vessel surrounding and spaced from the intermediate vessel to provide an intervening insulating space, first conduit means for conducting liquefied gas to and from the inner vessel, second conduit means for conducting liquid refrigerant to and from the intervening chamber, a vapor conduit communicating with the intervening chamber, a heat exchange device located in the inner vessel, heater means, means for passing a stream of liquid refrigerant through the heater means to the heat exchange device, and means for conducting the stream from the heat exchange device and discharging the stream into the intervening chamber.

10. A container as defined in claim 9 including means operable to discharge the heated stream directly into the intervening chamber.

11. Method of dispensing a stream of liquid material from a container including an inner vessel containing liquefied gas and a second vessel surrounding and spaced from the inner vessel to provide an intervening chamber containing a liquefied gas having a boiling point temperature below the boiling point temperature of the liquefied gas in the inner vessel, which comprises withdrawing a stream of liquefied gas from the intervening chamber, warming the withdrawn stream, transferring heat added to the withdrawn stream by the warming step to liquefied gas in one of the vessels, and utilizing the resulting pressure increase in the one vessel to positively force a stream of liquefied gas from the one vessel.

12. Method of dispensing liquefied gas from the inner vessel of a container including a second vessel surrounding and spaced from the inner vessel to provide an intervening chamber containing liquid material having a boiling point temperature below the boiling point temperature of the liquefied gas, which comprises withdrawing a stream of liquid material from the intervening chamber, warming the withdrawn stream, passing the warm stream in indirect heat exchange with liquefied gas in the inner vessel to increase the temperature of liquefied gas in the inner vessel, and utilizing the resulting pressure increase in the inner vessel to positively force a stream of liquefied gas from the inner vessel.

13. Method of dispensing liquefied gas from the inner vessel of a container including a second vessel surrounding and spaced from the inner vessel to provide an intervening chamber containing liquid material having a boiling point temperature below the boiling point temperature of the liquefied gas, which comprises withdrawing a stream of liquid material from the intervening chamber, warming the withdrawn stream, passing the warm stream in indirect heat exchange with liquefied gas in the inner vessel to increase the temperature of liquefied gas in the inner vessel, conducting the stream following the indirect heat exchange step into the intervening chamber, and utilizing the pressure increase in the inner vessel resulting from the indirect heat exchange step to positively force a stream of liquefied gas from the inner vessel.

14. A double walled container for liquefied gases comprising an inner vessel for holding liquefied gas, an outer vessel surrounding and spaced from the inner vessel to provide an intervening insulation space, supporting members traversing the intervening space and being connected to the vessels to support the inner vessel within the outer vessel, the supporting members being disposed in a plurality of groups located in spaced transverse planes, each group including a plurality of supporting members lying in the region of angularly spaced longitudinal planes passing through the longitudinal axis of the container, the supporting members being of substantially rectangular shape having a width dimension greater than its thickness dimension, the groups of supporting members including a supporting member disposed with its width dimension perpendicular to the longitudinal axis of the container and an adjacent supporting member disposed with its width dimension parallel to the longitudinal axis of the container.

*15. A tank assembly for storage of a normally gaseous material in liquid phase comprising, in combination, an outer tank having insulation therearound, an inner tank within and spaced from said outer tank providing intervening volume for liquid coolant lower boiling than said material, a valved inlet for said material and a valved outlet for said material in liquid phase disposed outside said outer tank, a discharge conduit for said material interconnecting the bottom of said inner tank with said valved outlet, a charge conduit for said material interconnecting said valved inlet with the upper portion of said second tank, said charge conduit providing within said intervening volume an elongate passageway, a valved inlet for liquid coolant disposed outside said outer tank, a conduit interconnecting said last named valved inlet and said intervening volume, and means venting said volume to the atmosphere.*

References Cited in the file of this patent or the original patent

UNITED STATES PATENTS

| | | |
|---|---|---|
| 747,280 | Vanderbilt | Dec. 15, 1903 |
| 1,237,146 | Armstrong | Aug. 14, 1917 |
| 1,330,361 | Todd | Feb. 10, 1920 |
| 1,680,873 | Lucas-Girardville | Aug. 14, 1928 |
| 1,940,277 | Stresau | Dec. 19, 1933 |
| 2,148,109 | Dana et al. | Feb. 21, 1939 |
| 2,381,796 | Williams | Aug. 7, 1945 |
| 2,626,813 | Mullen | Jan. 27, 1953 |
| 2,706,575 | Soherr | Apr. 19, 1955 |
| 2,834,187 | Loveday | May 13, 1958 |
| 2,863,297 | Johnston | Dec. 9, 1958 |

FOREIGN PATENTS

| | | |
|---|---|---|
| 701,765 | France | Jan. 13, 1931 |